United States Patent
Bottom et al.

(10) Patent No.: US 6,846,051 B2
(45) Date of Patent: *Jan. 25, 2005

(54) JOINT ASSEMBLY TO RESIST GALLING

(75) Inventors: Michael S. Bottom, Heyworth, IL (US); Thomas M. Hoefft, Dunlap, IL (US); Jeff A. Jensen, Dunlap, IL (US); Jason L. Kupferschmid, Franklin, NC (US); Eric A. Mathewson, Peoria, IL (US); Thomas E. Oertley, Dunlap, IL (US); John M. Plouzek, Peoria, IL (US); Dennis R. Shookman, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 12 days.

This patent is subject to a terminal disclaimer.

(21) Appl. No.: 10/082,752

(22) Filed: Feb. 25, 2002

(65) Prior Publication Data

US 2002/0145336 A1 Oct. 10, 2002

Related U.S. Application Data

(63) Continuation-in-part of application No. 09/642,676, filed on Aug. 21, 2000, now Pat. No. 6,485,116.

(51) Int. Cl.$^7$ .......................... B62D 55/12; F16G 13/02; B65D 53/00
(52) U.S. Cl. .......................... 305/202; 305/200; 305/105
(58) Field of Search .......................... 305/100, 104–106, 305/200, 202, 204, 193, 103, 102, 117, 195, 196, 203; 403/111, 213; 277/300, 301, 305, 311

(56) References Cited

U.S. PATENT DOCUMENTS

| | | | | | |
|---|---|---|---|---|---|
| 4,029,366 A | * | 6/1977 | Baylor | ...................... | 305/104 |
| 4,030,730 A | * | 6/1977 | Maguire | ...................... | 277/380 |
| 4,066,302 A | * | 1/1978 | Baylor | ...................... | 305/104 |
| 4,076,333 A | * | 2/1978 | Baylor | ...................... | 305/104 |
| 4,248,439 A | * | 2/1981 | Haslett | ...................... | 277/380 |
| 4,274,682 A | * | 6/1981 | Livesay | ...................... | 305/103 |
| 4,311,346 A | * | 1/1982 | Danner | ...................... | 305/103 |
| 4,402,555 A | * | 9/1983 | Ogaki et al. | ................. | 305/102 |
| 4,426,091 A | * | 1/1984 | Baylor | ...................... | 305/103 |
| 5,257,858 A | * | 11/1993 | Taft | ........................... | 305/204 |
| 5,390,997 A | * | 2/1995 | Nakaishi et al. | ............ | 305/103 |
| 5,553,931 A | | 9/1996 | Diekevers | | |
| 6,074,023 A | * | 6/2000 | Satou et al. | ................. | 305/116 |
| 6,176,491 B1 | * | 1/2001 | Bertoni | ...................... | 277/345 |
| 6,371,577 B1 | * | 4/2002 | Hasselbusch et al. | ........ | 305/100 |
| 6,382,742 B1 | * | 5/2002 | Hasselbusch et al. | ........ | 305/102 |
| 6,386,651 B1 | * | 5/2002 | Gerardin et al. | ............ | 305/100 |
| 6,390,572 B1 | * | 5/2002 | Idetsu et al. | ................. | 305/103 |
| 6,481,807 B1 | * | 11/2002 | Barani et al. | ............... | 305/100 |
| 6,485,116 B1 | * | 11/2002 | Oertley | ....................... | 305/200 |
| 6,561,333 B2 | * | 5/2003 | Larson et al. | ............. | 192/41 S |

* cited by examiner

Primary Examiner—Russell D. Stormer
Assistant Examiner—Jason R. Bellinger
(74) Attorney, Agent, or Firm—Diana Charlton

(57) ABSTRACT

Joint assemblies are useful for connecting one structure to another structure. When the various structures deflect or bend, edge loading occurs therebetween. The subject joint assembly includes a pin positioned between a first and second structure. An insert is free floating positioned around the pin for contacting either of the first or second structures. A crown shaped surface is utilized on the insert at a substantially central location therealong. The crown shaped surface directs forces to the center of the insert to reduce edge loading.

51 Claims, 5 Drawing Sheets

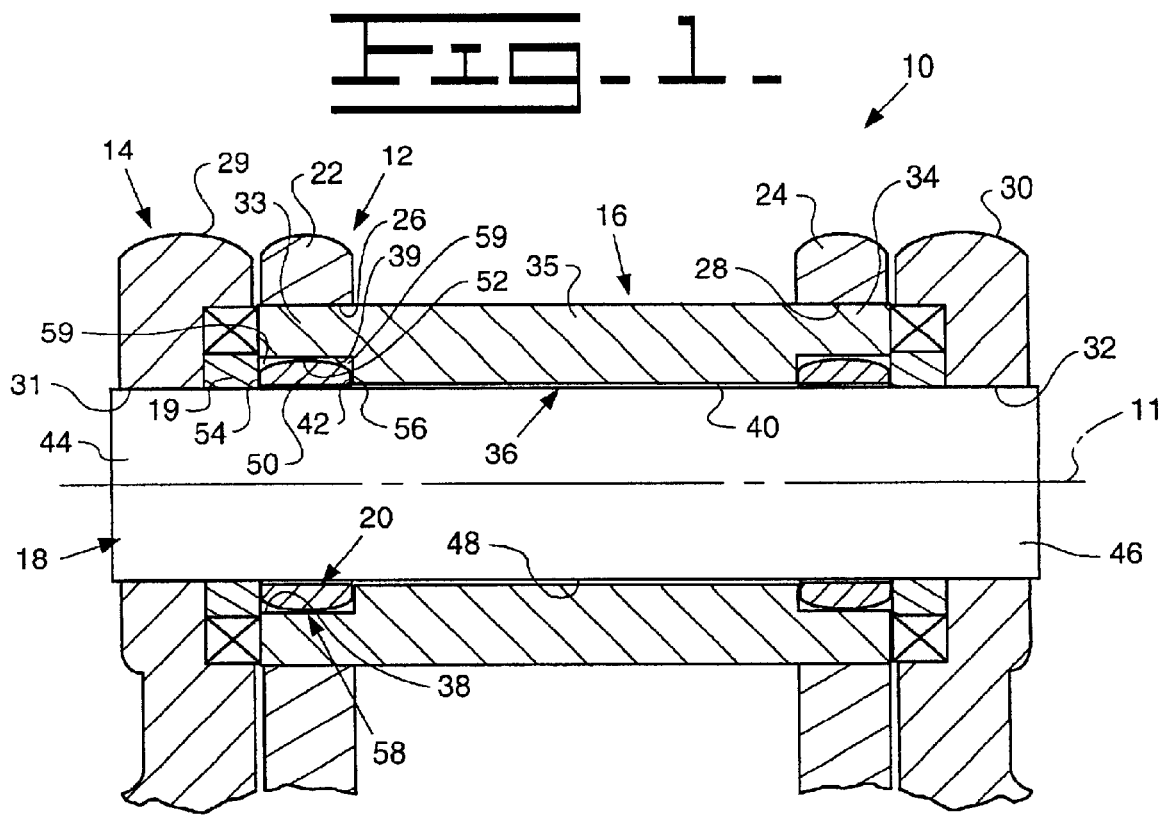
Fig. 1.
Fig. 2.
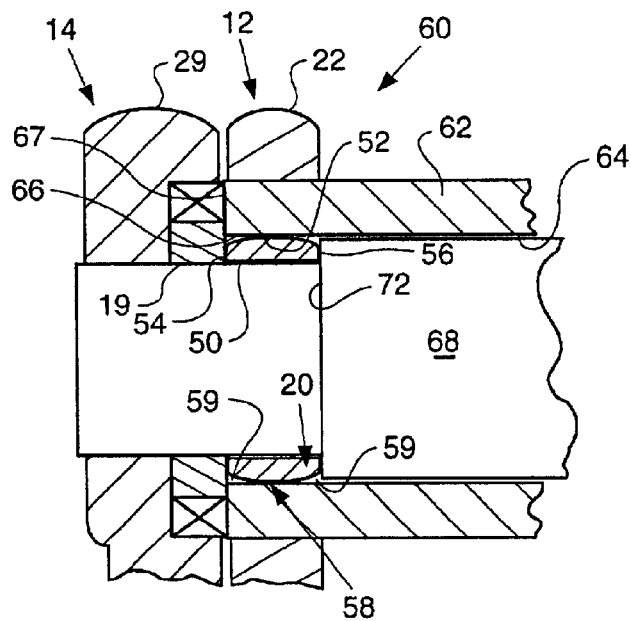

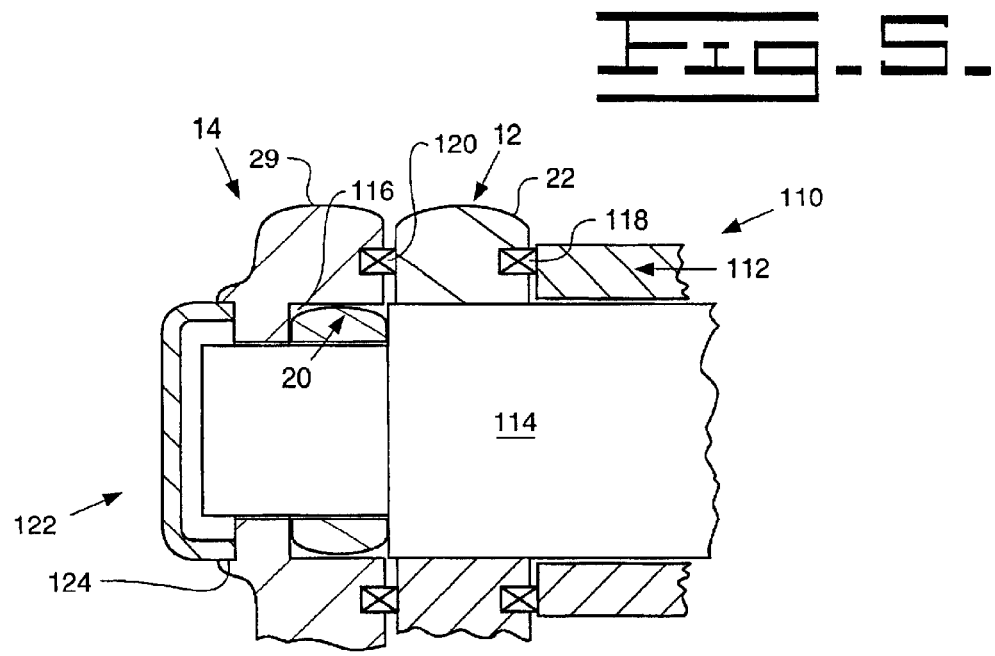
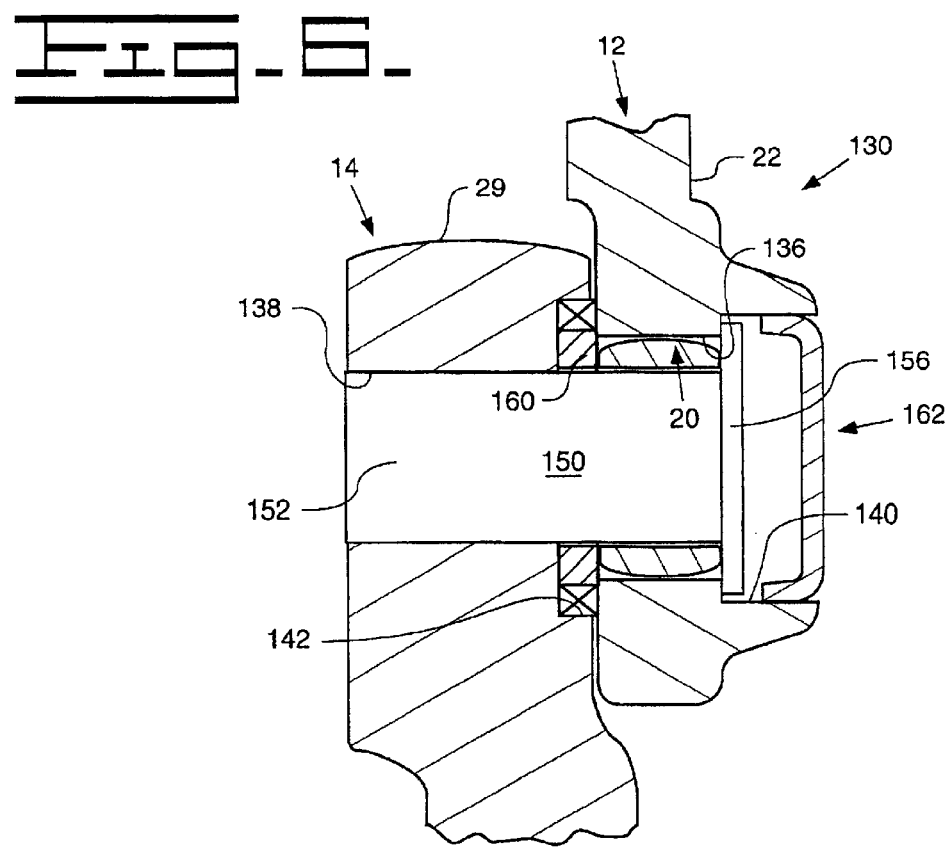

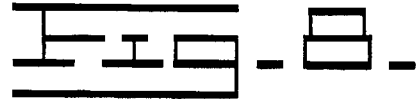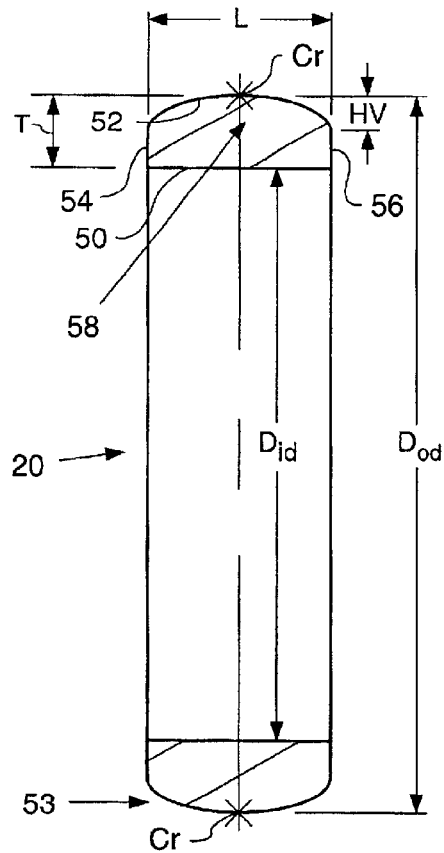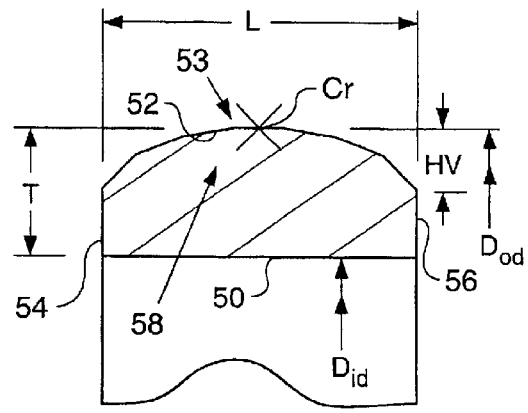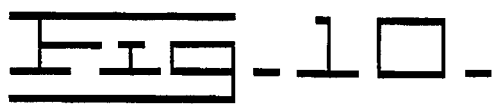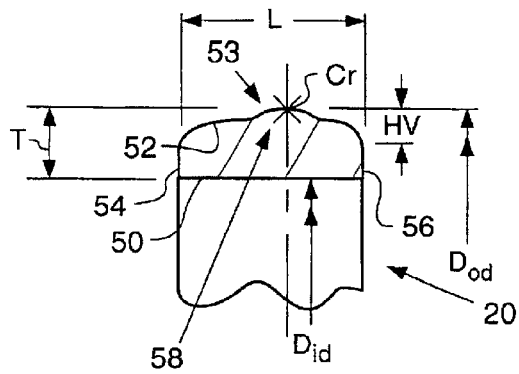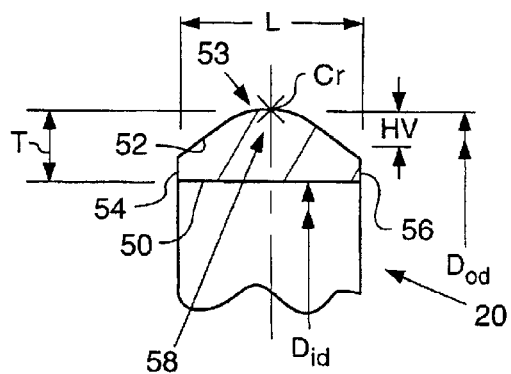

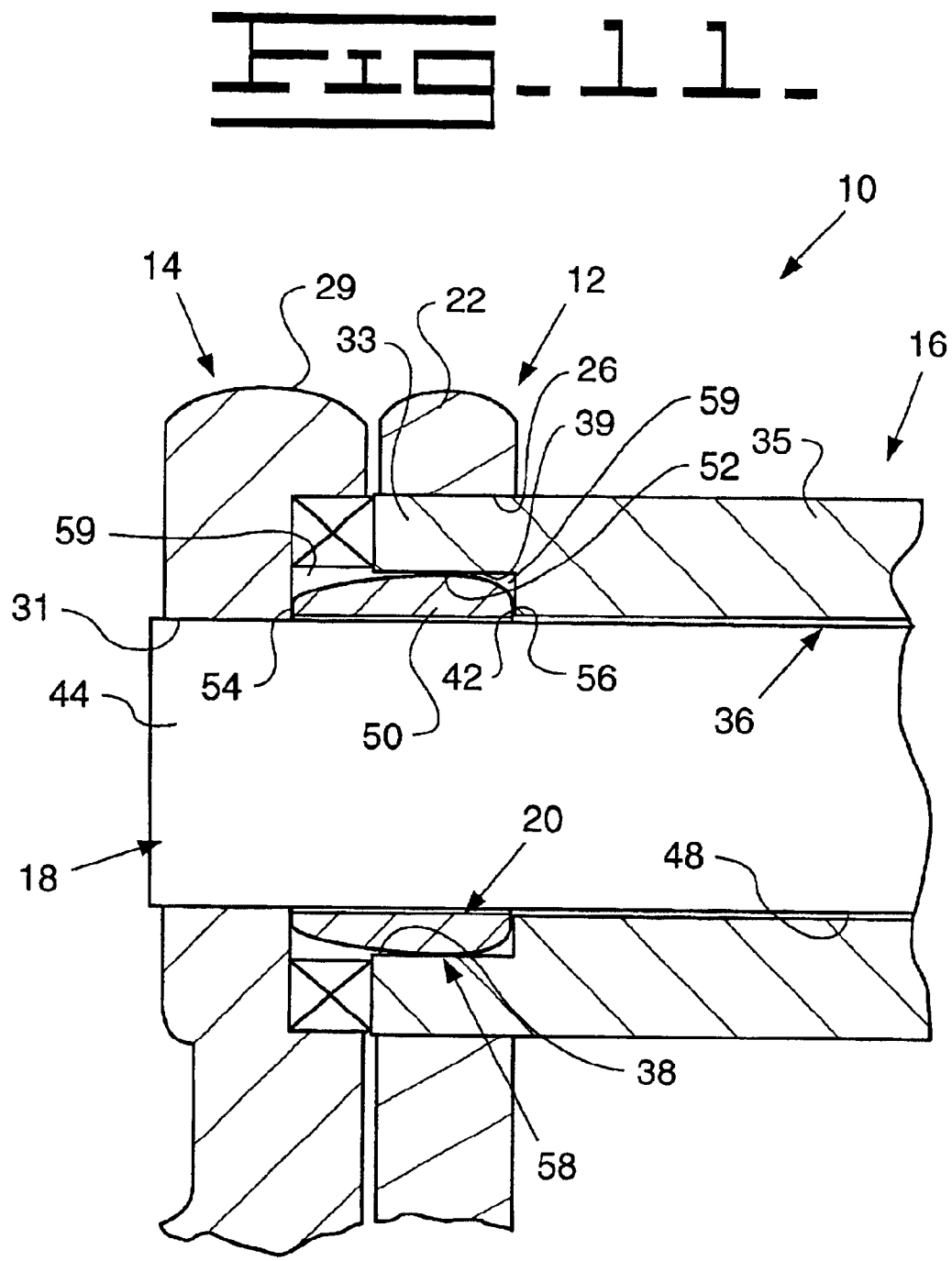

JOINT ASSEMBLY TO RESIST GALLING

This application is a continuation-in-part of application Ser. No. 09/642,676 filed Aug. 21, 2000 now U.S. Pat. No. 6,485,116.

TECHNICAL FIELD

This invention relates to a joint assembly for connecting oscillating or rotating structures together, and more particularly, to an arrangement utilizing a crown shaped insert free-floating positioned between the structures to resist galling.

BACKGROUND ART

Joint assemblies, such as a track joint, are customarily held together by a press or interference fit between the ends of a track pin and the respective bores of a track link. A track bushing may be used between the track pin and the track link. During use, the track joint assembly will receive loading and have a tendency to deflect and bend the track pin. The deflection and bending of the track pin may result in edge loading and resulting stresses on the various track components as they move relative to one another. The edge loading stresses have a tendency to wear or gall the various track components during contact with the deflected track pin. For this reason, it is well known to manufacture a portion of the track bushing with a ramped profile on the inner diameter to establish a predetermined operational clearance between the track pin and the track bushing. Unfortunately, this solution increases operational clearance between the track components but results in a less compact and efficient joint assembly. Additionally, other joint assemblies, such as a pin joint on a frame and the like, utilize a pin that is press or interference fit within adjacent structure to connect oscillating or rotating structures. These pin joint assemblies incur similar edge loading concerns as the track joint assembly. Unfortunately, many methodologies have been unsuccessful in the reduction of edge loading on these joint assemblies, as well. Therefore, the ability to reduce edge loading with minimal operational clearance between the pin and adjacent structures would provide a more effective and wear-resistant joint assembly.

The present invention is directed to overcoming one or more of the problems as set forth above.

DISCLOSURE OF THE INVENTION

In one aspect of the present invention, a joint assembly is disclosed having first and second structures. The first and second structures have limited movement relative to one another. The joint assembly comprises a pin that extends between the first and second structures. An insert surrounds a portion of the pin and is free floating positioned between the pin and one of the first or second structures.

In another aspect of the present invention, a joint assembly is adapted to connect a first structure to a second structure. The joint assembly comprises a pin that extends between the first and second structures. An insert is positioned within one of the first or second structures for surrounding a portion of the pin. The insert has at least one crown shaped surface thereon.

In yet another aspect of the present invention, a joint assembly is adapted to connect a first structure to a second structure. The joint assembly comprises a pin that extends between the first and second structures. An insert is positioned within one of the first or second structures for surrounding a portion of the pin. The one of the first and second structures has at least one crown shaped surface thereon.

The present invention provides a joint assembly having an insert free floating positioned between two oscillating structures to reduce wear and galling therebetween. Further, the insert may have at least one crown shape surface thereon to reduce wear and galling between two oscillating or rotating structures.

BRIEF DESCRIPTION OF THE DRAWINGS

FIG. 1 is a diagrammatic sectional view of a structure using the present invention;

FIG. 2 is a diagrammatic sectional view of a second embodiment of the present invention;

FIG. 5 is a diagrammatic sectional view of a fifth embodiment of the present invention;

FIG. 6 is a diagrammatic sectional view of a sixth embodiment of the present invention;

FIG. 7 is a partial sectional view of an insert used in the present invention;

FIGS. 8–10 are partial sectional views of alternate embodiments of the insert in the present invention; and FIG. 11 is a diagrammatic sectional view of an alternate embodiment of the structure shown in FIG. 1.

BEST MODE FOR CARRYING OUT THE INVENTION

Figure 3:
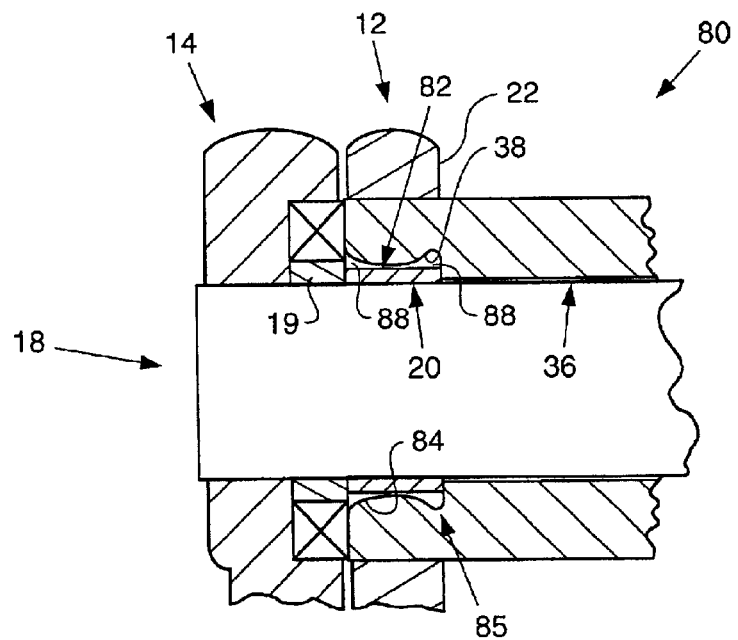
FIG. 3 is a diagrammatic sectional view of a third embodiment of the present invention.

Referring to FIG. 1, a joint assembly 10 of the present invention is provided. The joint assembly 10 is used to connect a track chain (not shown) for use on a track type tractor (not shown) or similar tracked machine. The joint assembly 10 extends axially along an axis 11. The joint assembly 10 includes a first structure such as a first pair of spaced apart track links 12 and a second structure such as a second pair of spaced apart track links 14. A sleeve such as a track bushing 16 is positioned within the first structure 12. A track pin 18 is positioned within the second structure 14 and the track bushing 16. An insert 20, seen in detail in FIG. 7, is positioned between the track bushing 16 and the pin 18 and has a length L and thickness T. The track bushing 16, pin 18 and the insert 20 are made from any suitable material, such as steel. Referring specifically again to FIG. 1, a thrust ring 19 is positioned between the insert 20 and the second structure 14 to carry axial loads therebetween. Sealing of any suitable type is used to maintain a predetermined amount of lubricating fluid (not shown) within the joint assembly 10. Referring to FIG. 11, it should be understood that the thrust ring 19, seen in FIG. 1, may be replaced by an elongated insert 20. In this embodiment, the function of the thrust ring 19 is achieved with the elongated portion of the insert 20 to achieve similar results.

The first and second structures 12, 14 are shown as pairs of spaced track links, however, the present invention can be used in any structure having oscillating or rotating movement therebetween. For example, a cantilevered pin used to connect two component structures, such as a pin joint between a frame (not shown) and a loader arm (not shown), may utilize the present invention and achieve similar results.

The first structure 12 includes a first track link 22 and a second track link 24. The first track link 22 includes a bore 26 and the second track link 24 includes a bore 28. The bores 26,28 are aligned along the axis 11. The second structure 14 includes a first track link 29 and a second track link 30. The first track link 29 includes a bore 31 and the second track link 30 includes a bore 32. The bores 31,32 are aligned with the bores 26,28 of the first structure 12 along the axis 11.

The track bushing 16 is positioned in the bores 26,28 and axially extends between the first and second track links 22,24. The track bushing 16 includes a first end portion 33, a second end portion 34, an intermediate portion 35 and a stepped bore 36 axially extending therethrough. The stepped bore 36 in the first and second end portions 33,34 has a first predetermined inner diameter 38 and the bore 36 in the intermediate portion 35 has a second predetermined inner diameter 40. The second predetermined inner diameter 40 is smaller in magnitude than the first predetermined diameter 38. A wall 42 extends between the first diameter 38 and the second diameter 40.

The pin 18 is positioned within the track bushing 16 and includes end portions 44,46, axially extending past the track bushing 16, and a predetermined outer diameter 48. The end portions 44,46 extend past the first and second track links 22,24 and extend into the bores 31,32 of the first and second track links 29,30. The pin 18 is maintained in the bores 31,32 of the first and second track links 29,30 by an interference fit to prevent axial movement of the structures relative to each other.

Referring specifically now to both FIGS. 1 and 7, the insert 20 is free floating positioned around the pin 18 and within the first diameter 38 of the bore 36 in the end portions 33,34 of the track bushing 16. The insert 20 includes an inner diameter $D_{id}$ having an inner planar surface 50. The inner diameter $D_{id}$ is less than the first and second diameters 38,40 of the track bushing 16 and greater than the outer diameter 48 of the pin 18. The insert 20 includes an outer diameter $D_{od}$ having an outer curvilinear surface 52 with an outermost portion 53, a first side surface 54 and a second side surface 56.

As seen best in FIG. 7, the outer surface 52 of the insert 20 has a crown shape 58 with a height variation HV thereacross. The height variation HV is preferably between 0.02–0.18 mm and establishes an edge gap 59, seen in FIG. 1, on either side of the crown $C_r$ at the outermost portion 53 of the insert 20. It should be understood that although the crown $C_r$ of the insert 20 is shown in a substantially central location along the outer surface 52, the position of the crown $C_r$ may be offset, preferably inwardly, toward the second side surface 56. Further, although the shape of the entire outer surface 52 is shown substantially circular, it should also be understood that parabolic, elliptical or other curvilinear surface shapes are preferably utilized to define the crown shape 58. However, as seen in FIG. 8, a plurality of straight lines may also be utilized to achieve a substantial curvilinear surface shape and be within the scope of the invention. Further, it should be understood that only a portion of the outer surface 52 need have a curvilinear or substantially curvilinear crown shape 58. For example, as seen in FIGS. 9–10, the outer surface 52 may consist of various radii or may be frustoconical, domed or any suitable shape that defines at least one curvilinear or substantially curvilinear crown shape 58 along the outer surface 52 at the outermost portion 53 of the insert 20. In this instance, the outermost portion 53 should lie along the surface of the outer diameter $D_{od}$.

The optimal size of the insert 20 is determined by a ratio of the length L to the inner diameter $D_{id}$, preferably 0.4–0.8, and a ratio of the thickness T to the outer diameter $D_{od}$, preferably 0.04–0.12. The external surfaces of the insert 20 are surface treated, such as by nitriding, direct hardening or the like, to produce a hard surface layer that extends a predetermined depth therein. However, it should be understood that a hard surface layer is only required on the inner and outer surfaces 50,52 of the insert 20 to establish different material properties than the material used on the track bushing 16 and pin 18. Further, the inner and outer surfaces 50,52 of the insert 20 should be manufactured to a predetermined surface finish to achieve desired performance within the joint assembly 10. More precisely, the predetermined surface finish on the inner and outer surfaces 50,52 is preferably less than or equal to the adjacent surface on the track bushing 16 and pin 18.

FIGS. 2–6 disclose various alternate embodiments of the present invention joint assembly. The reference numbers used to designate particular elements in FIG. 1 are used to designate the same or similar elements in FIGS. 2–6. Further, although only one side of the alternate joint assemblies is shown in detail for clarity, it should be obvious that the opposite sides are substantially identical.

Referring to FIG. 2, an alternate joint assembly 60 is disclosed. In this particular embodiment, a sleeve 62 is positioned in the first structure 12 and includes a straight bore 64 having an inner surface 66 and a side surface 67. A stepped pin 68 is positioned in the second structure 14 and extends into the bore 64 of the sleeve 62. The pin 68 includes a wall 72. The insert 20 is free floating positioned around the pin 68 and slideably interacts with the sleeve 62 at outer surface 52 and slideably interacts with the wall 72 at side surface 56. The thrust ring 19 is positioned around the pin 68 and slideably interacts with the insert 20 and the sleeve 62 at side surfaces 54, 67, respectively.

Referring to FIG. 3, an alternate joint assembly 80 is disclosed. In this particular embodiment, a modification of FIG. 1 has been made to provide a crown shape 82 along an inner surface 84 of the first diameter 38 of the bore 36 of the track bushing 16 at an innermost portion 85 thereof similar to the crown shape 58 on the outer surface 52 of the insert 20 of FIG. 1. Further, the insert 20 has been modified to shape the outer surface 52 similar to the first diameter 38 of FIG. 1 to provide a substantially planar surface 86 for interacting with the crown shape 82. Edge gaps 88 are established on either side of the crown $C_r$ of the crown shape 82 on the inner surface 84.

Figure 4:
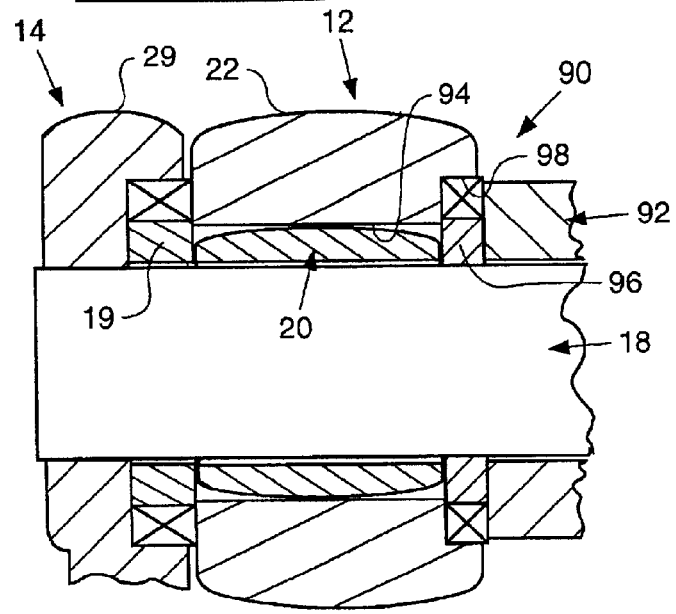
FIG. 4 is a diagrammatic sectional view of a fourth embodiment of the present invention.

Referring to FIG. 4, an alternate joint assembly 90 is disclosed in the form of a rotating track bushing design. In this particular embodiment, a track bushing 92 is free to rotate between the first and second track links 22,24. The insert 20 is free floating positioned around the pin 18 and directly within a bore 94 of the first structure 12. A thrust ring 96 is seated within an outer bore 98 of the first structure 12 for slideable interaction with the insert 20 and the track bushing 92.

Referring to FIG. 5, an alternate joint assembly 110 is disclosed in the form of another rotating track bushing design. In this embodiment, a track bushing 112 is free to rotate between the first and second track links 22,24. The insert 20 is free floating positioned around a stepped pin 114 and within bore 116 of the second structure 14. A thrust ring 118 is integral with the first structure 12 to carry axial loads against the track bushing 112. Another thrust ring 120 is integral with the second structure 14 to carry axial loads against the first structure 12. A retainer 122 of any suitable type is positioned in an outer bore 124 of the second structure 14 to assist in holding lubricating fluid within the joint assembly 110.

Referring to FIG. 6, an alternate joint assembly 130 is disclosed in the form of a cantilevered pin design. In this embodiment, the first and second structures 12,14 each have a respective pin bore 136,138 therethrough. The first and second structures 12,14 have outer and inner bores, each of which are respectively shown at 140,142. A pin 150 is shown with a body portion 152 having a first diameter and a head portion 156 having a second diameter larger than the first diameter. The body portion 156 of the pin 150 extends through the pin bores 136,138 of the first and second structures 12,14 and the head portion 156 is seated within the outer bore 140 of the first structure 12. The insert 20 is free floating positioned around the body portion 152 of the pin 150 and within the pin bore 136 of the first structure 12. A thrust ring 160 is positioned within the bore 142 of the second structure 14 to carry axial loads between the first and second structures 12,14. A retainer 162 of any suitable type is positioned within bore 140 of the first structure 12 outward of the head portion 156 of the pin 150 to assist in holding lubricating fluid within the joint assembly 130. It should be understood that the components within the embodiment disclosed in FIG. 6 may be reversed and achieve similar results. More specifically, the head portion 156 of the pin 150, the insert 20 and the retainer 162 may be positioned in the second structure 14 and the thrust ring 160 may be positioned within the first structure 12. Additionally, it should be understood that one of the first or second pair of spaced track links 22,24,29,30 shown in FIGS. 4–6 may include the crown shape, as is similar to FIG. 3, with a planar insert and achieve similar results. Further, it should be understood that the cantilevered pin design may be used to connect the frame (not shown) and the loader arm (not shown), as mentioned above.

INDUSTRIAL APPLICABILITY

Referring to FIGS. 1–2, joint assemblies 10,60 include the first spaced structure 12 connected together by the respective bushing or sleeve 16,62 and the second spaced structure 14 connected together by the respective pin 18,68. During operation, the joint assemblies 10,60 move relative to one another a predetermined amount that is limited by the constraints of the structure. Due to such movement, loading is incurred that deflects the respective pin 18,68 and/or the respective track bushing or sleeve 16,62. The insert 20 is provided as a component acting between the respective pin 18,68 and the respective track bushing 16,62. Due to its position around the respective pin 18,68, the insert 20 follows the pin's deflection. However, due to the crown shape 58 of the insert 20 being curvilinear or substantially curvilinear at the outermost portion 53 thereof, load forces from the respective track bushing 16,62 are directed toward the crown $C_r$ of the insert 20. Therefore, edge loading on the respective pin 18,68 and/or the respective track bushing or sleeve 16,62 is reduced because the edge gaps 59,88 provide optimal operational clearance between the components to compensate for the deflection and to avoid contact therebetween.

Because the inserts 20 are able to free float 360 degrees around the respective pin 18,68, sliding rotation occurs between the outer surface 52 of the insert 20 and the respective track bushing 16,62, the side surface 56 of the insert 20 and the respective wall 42,72, the inner surface 50 of the insert 20 and the respective pin 18,68 and the side surface 54 of the insert 20 and the thrust ring 19. Additionally, the surface hardness of the insert 20 prevents adherence between adjacent structures due to different surface layer material characteristics being created so that adequate floating of the insert 20 is ensured. Therefore, the load forces on the insert 20 are continuously directed at different locations around the periphery of the insert 20 as it floats to distribute loading and avoid concentrated wear patterns. The edge gaps 59 also ensure that adequate lubricating fluid is maintained around the insert 20. Reduced edge loading in conjunction with the floating and lubrication of and around the insert 20 virtually eliminates galling and wear between the structures. Further, overall operational clearance between the structures is reduced because utilization of the insert 20 provides optimal operational clearance at the edge gaps 59,88. Therefore, operational clearance that is typically established through manufacturing of surrounding components is eliminated to produce a more compact and efficient joint assembly.

Referring to FIG. 3, joint assembly 80 functions similarly to joint assemblies 10,60 in that the insert 20 follows the deflection of the pin 18. However, load forces from the insert 20 are directed toward the crown $C_r$ at the innermost portion 83 of the inner surface 84 of the diameter 38 of the bore 36 to reduce edge loading. Again, the insert 20 is free floating so that the load forces project from different locations around the periphery of the insert 20. Like the embodiments of FIGS. 1–2, the edge gaps 88 ensure that adequate lubricating fluid is maintained around the insert 20. Therefore, as with the embodiments of FIGS. 1–2, reduced edge loading is achieved to virtually eliminate galling and wear between the structures. Further, operational clearance between the structures is reduced.

Referring to FIGS. 4–5, joint assemblies 90,110 include the first and second spaced structures 12,14 connected together by the respective pin 18,114. The respective rotating bushings 92,112 are positioned between the first and second track links 22,24. In this embodiment, the insert 20 is provided as a component acting directly between the respective pin 18,114 and the track links 22,24 without the utilization of a track bushing. When the insert 20 follows the deflection of the pin 18, load forces from the track links 22,24 are directed toward the crown $C_r$ at the outermost portion 53 of the insert 20 to reduce edge loading on the respective pin 18,114 and/or track link 22,24. Other aspects and function of the insert 20 are substantially the same as in FIGS. 1–3.

Referring to FIG. 6, joint assembly 130 includes connection of the first and second structure 12,14 via a cantilevered pin 150. Again, as in FIGS. 4–5, the insert 20 is provided as a component acting directly between the pin 150 and the track links 22,24 without the utilization of a track bushing. Other aspects and function of the insert 20 are substantially the same as in FIGS. 1–5.

Although the joint assemblies 10,60,80,90,110,130 are described as having limited movement relative to one another, it should be understood that the crown shape 58 of the insert 20 provide advantages in joint assemblies with full rotational movement relative to one another, such as the frame (not shown) and loader arm (not shown) mentioned above.

In view of the forgoing, it is readily apparent that the present invention reduces wear and galling between structures having oscillating or rotating movement therebetween.

Other aspects and advantages of this invention can be obtained from a study of the drawings, the disclosure and the appended claims.

What is claimed is:

1. A track joint assembly adapted to connect a track chain together, the track chain having first and second structures, the track joint assembly comprising:
   a track pin extending between the first and second structures; and
   an insert surrounding a portion of the track pin, the insert being free floating positioned between the track pin and one of the first or second structures, wherein the insert is able to move 360 degrees around the track pin.

2. The track joint assembly of claim 1, wherein the insert has at least one crown shaped surface thereon.

3. The track joint assembly of claim 2, wherein the insert has an outermost portion and the crown shaped surface is at least partially located at the outermost portion of the insert.

4. The track joint assembly of claim 2, wherein the insert has an outer surface with an outermost portion and the crown shaped surface has a crown positioned at a substantially central location along the outer surface of the insert at the outermost portion.

5. The track joint assembly of claim 2, wherein the crown shaped surface is curvilinear.

6. The track joint assembly of claim 2, wherein the one of the first or second structures has an inner surface to facilitate sliding rotation with the crown shaped surface on the insert.

7. The track joint assembly of claim 2, wherein the insert is free floating positioned between the track pin and the first structure and includes a sleeve positioned within the first structure and having an inner surface to facilitate sliding rotation with the crown shaped surface on the insert.

8. The track joint assembly of claim 1, wherein the insert is free floating positioned between the track pin and both the first and second structures.

9. The track joint assembly of claim 8, wherein the insert has at least one crown shaped surface thereon.

10. The track joint assembly of claim 1, wherein the one of the first or second structures has at least one crown shaped surface thereon.

11. The track joint assembly of claim 10, wherein the one of the first or second structures has an inner surface the crown shaped surface being located at the inner surface of the one of the first or second structures.

12. The track joint assembly of claim 11, wherein the crown shaped surface has a crown positioned at a substantially central location along the inner surface of the one of the first or second structures.

13. The track joint assembly of claim 11, wherein the insert has a outer surface to facilitate sliding rotation with the inner surface of the one of the first or second structures.

14. The track joint assembly of claim 10, wherein the crown shaped surface is curvilinear.

15. The track joint assembly of claim 1, wherein the insert has a length, a thickness and inner and outer diameters, the length to inner diameter being within an optimal range of 0.4–0.8 and the thickness to outer diameter being within an optimal range of 0.04–0.12.

16. The track joint assembly of claim 15, wherein the insert has an outer surface incorporating the surface of the outer diameter and at least one crown shaped surface located along the outer surface at the outer diameter.

17. The track joint assembly of claim 15, wherein the outer diameter has an outer surface that defines the crown shape surface.

18. A joint assembly, comprising:
    first and second structures having limited movement relative to one another;
    a pin extending between the first and second structures; and
    an insert surrounding a portion of the pin, the insert being free floating positioned between the pin and one of the first or second structures, wherein the insert is able to move 360 degrees around the track pin.

19. The joint assembly of claim 18, wherein the insert has at least one crown shaped surface thereon.

20. The joint assembly of claim 19, wherein the insert has an outermost portion and the crown shaped surface is located at least partially at the outermost portion of the insert.

21. The joint assembly of claim 19, wherein the insert has an outer surface with an outermost portion and the crown shaped surface has a crown positioned at a substantially central location along the outer surface of the insert at the outermost portion.

22. The joint assembly of claim 19, wherein the crown shaped surface is curvilinear.

23. The joint assembly of claim 19, wherein the one of the first or second structures has an inner surface to facilitate sliding rotation with the crown shaped surface on the insert.

24. The joint assembly of claim 19, wherein the insert is free floating positioned between the track pin and the first structure and includes a sleeve positioned within the first structure and having an inner surface to facilitate sliding rotation with the crown shaped surface on the insert.

25. The joint assembly of claim 18, wherein the insert is free floating positioned between the pin and both the first and second structures.

26. The track joint assembly of claim 25, wherein the insert has at least one crown shaped surface thereon.

27. The joint assembly of claim 18, wherein the one of the first or second structures has at least one crown shaped surface thereon.

28. The joint assembly of claim 27, wherein the one of the first or second structures has an inner surface, the crown shaped surface being located at the inner surface of the one of the first or second structures.

29. The joint assembly of claim 28, wherein the crown shaped surface has a crown positioned at a substantially central location along the inner surface (39) of the one of the first or second structures.

30. The joint assembly of claim 28, wherein the insert has a outer surface to facilitate sliding rotation with the inner surface of the one of the first or second structures.

31. The joint assembly of claim 27, wherein the crown shaped surface is curvilinear.

32. The joint assembly of claim 18, wherein the insert has a length, a thickness and inner and outer diameters the length to inner diameter being within an optimal range of 0.4–0.8.

33. The joint assembly of claim 18, wherein the insert has a length, a thickness and inner and outer diameters, the thickness to outer diameter being within an optimal range of 0.04–0.12.

34. The joint assembly of claim 32, wherein the insert has an outer surface incorporating the surface of the outer diameter and at least one crown shaped surface located along the outer surface at the outer diameter.

35. The joint assembly of claim 32, wherein the outer diameter has an outer surface that defines the crown shape surface.

36. The joint assembly of claim 33, wherein the insert has an outer surface incorporating the surface of the outer diameter and at least one crown shaped surface located along the outer surface at the outer diameter.

37. The joint assembly of claim 33, wherein the outer diameter has an outer surface that defines the crown shape surface.

38. A joint assembly adapted to connect a first structure to a second structure, the joint assembly comprising:

a pin extending between the first and second structures; and an insert being positioned within one of the first or second structures for surrounding a portion of the pin, the one of the first and second structures having at least one crown shaped surface thereon.

39. The joint assembly of claim 38, wherein the first and second structures move relative to one another.

40. The joint assembly of claim 38, wherein the crown shaped surface is curvilinear.

41. The joint assembly of claim 38, wherein the one of the first and second structures has an inner surface that defines the crown shape.

42. The joint assembly of claim 38, wherein the one of the first and second structures has an inner surface with an innermost portion and the crown shaped surface has a crown positioned at a substantially central location along the inner surface of the one of the first and second structures at the innermost portion.

43. The joint assembly of claim 38, wherein the one of the first and second structures has an inner surface with an innermost portion and the crown shaped surface has a crown positioned offset from a central location along the inner surface of the one of the first and second structure at the innermost portion.

44. The joint assembly of claim 38, wherein the crown shaped surface is adjacent the insert.

45. The joint assembly of claim 38, wherein the insert is free floating positioned between the pin and the one of the first and second structures, wherein the insert is able to move 360 degrees around the track pin.

46. A joint assembly adapted to connect a first structure to a second structure, the joint assembly comprising:

a pin extending between the first and second structures; and an insert being positioned within both the first and second structures for surrounding a portion of the pin, the insert having at least one crown shaped surface thereon and being free floating positioned between the pin and the first and second structures, wherein the insert is able to move 360 degrees around the track pin.

47. The joint assembly of claim 46, wherein the first and second structures move relative to one another.

48. The joint assembly of claim 46, wherein the crown shaped surface is curvilinear.

49. The joint assembly of claim 46, wherein the insert has an outer surface that defines the crown shape.

50. The joint assembly of claim 46, wherein the insert has an outer surface with an outermost portion and the crown shaped surface has a crown positioned at a substantially central location along the outer surface of the insert at the outermost portion.

51. The joint assembly of claim 46, wherein the insert has an outer surface with an outermost portion and the crown shaped surface has a crown positioned offset from a central location along the outer surface of the insert at the outermost portion.

* * * * *